Patented Mar. 31, 1953

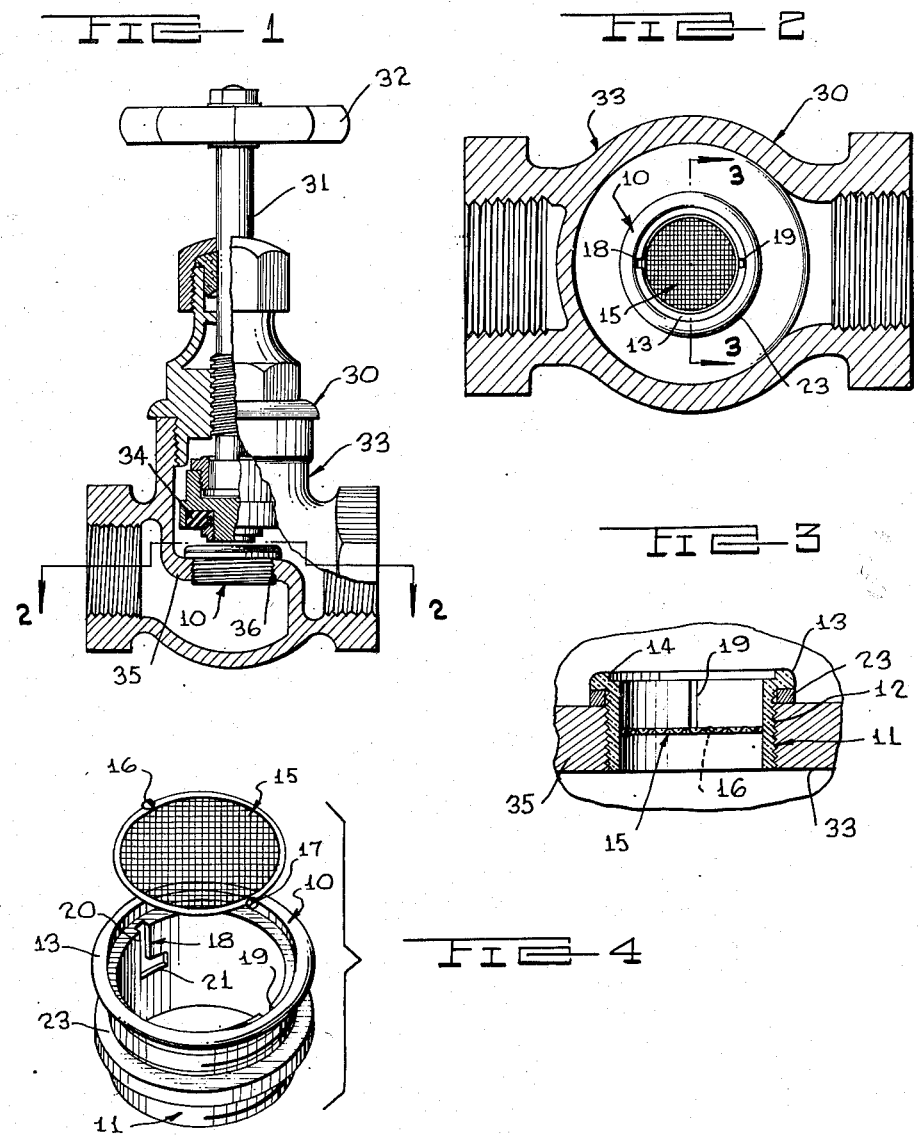

2,633,149

UNITED STATES PATENT OFFICE 2,633,149

COMBINATION VALVE SEAT AND STRAINER

John B. McKenna, Forest Park, Ill.

Application September 12, 1950, Serial No. 184,492

1 Claim. (Cl. 137—550)

This invention relates to a combination valve seat and strainer for attachment in a faucet, valve or the like.

An object of this invention is to provide a valve seat which is fabricated of a heat-resistant, glass-containing, homogeneous material to thereby particularly adapt the seat to withstand excessive temperature changes.

Another object of this invention is to provide a valve seat fabricated of a homogeneous material to thereby particularly adapt the seat for a perfect fit with a valve element.

A further object of this invention is to provide a combination valve seat and strainer for a faucet which is particularly adapted to keep rust, grit and like particles out of the water being withdrawn from the faucet.

A still further object of this invention is to provide a valve seat including novel means for mounting the seat within a valve body to form a watertight seat between the valve seat and the valve body.

A still further object of this invention is to provide a combination valve seat and strainer for a faucet which is relatively simple in structure and cheap to manufacture.

The above and still further objects and advantages of the invention will become apparent upon consideration of the following detailed description of the invention, when taken in conjunction with the accompanying drawings, wherein:

Figure 1 is an elevational view of the combination valve seat and strainer of the invention, shown supported within a globe valve, the latter being partially broken away and shown in section;

Figure 2 is an enlarged sectional view taken along the line 2—2 of Figure 1;

Figure 3 is a fragmentary sectional view taken along the line 3—3 of Figure 2; and Figure 4 is an exploded perspective view of the combination valve seat and strainer of the present invention.

When employing brass or other metal seats in faucets, valves and the like, the constant pressure and temperature ranges often flake or wash out sand and other foreign materials often found in the metal seats. This wearing results in a leaky faucet, since a continuous unbroken seat is necessary for a watertight engagement between the valve seat and the valve element. Furthermore, the washed-out articles admix with the water being drawn from the faucet or valve and present a health hazard.

The foregoing difficulties have been obviated by the combination valve seat and strainer of the present invention, generally designated by the reference numeral 10, which embodies an open-ended, cylindrical sleeve 11 fabricated of a homogeneous heat-resistant, glass-containing material, such as Pyrex. The outer periphery of the sleeve 11 is threaded, as indicated by the reference numeral 12, the threads extending inwardly from one end of the sleeve 11 and terminating adjacent to and spaced from the other end thereof. The threads 12 particularly adapt the sleeve for securement within any suitable valve seat-receiving aperture provided in a faucet, valve or the like.

Secured to or formed integrally with the other end of the cylindrical sleeve 11 is an outwardly directed annular flange 13 which is adapted to overlie the adjacent portions of a valve body upon securement of the sleeve 11 within a valve seat-receiving aperture.

Extending inwardly from the end of the cylindrical sleeve 11 carrying the annular flange 13, there is provided a counterbore 14 which terminates adjacent to said end and forms a seat for a valve element.

Disposed transversely within the cylindrical sleeve 11 intermediate the open ends thereof is a strainer 15 which is detachably secured within the sleeve 11 by means of the opposed projecting lugs 16 and 17 which are engaged within the L-shaped slots 18 and 19 formed on the inner periphery of the cylindrical sleeve. As clearly shown in Figure 4, the L-shaped slot 18 has a leg 20 which extends longitudinally of the sleeve 11 and has a leg 21 which extends transversely of the sleeve 11 and is in communication with the longitudinally extending leg 20. The L-shaped slot 19 similarly includes a longitudinally extending leg which is arranged in face-to-face relation with the leg 20 of the slot 18 and a transversely extending leg which is offset in the opposite direction with respect to the leg 21 of the slot 18. Accordingly, on inserting the opposed lugs 16 and 17 into the L-shaped slots and effecting a slight rotation of the strainer 15, the latter is detachably secured within the sleeve 11.

Circumposed about the cylindrical sleeve 11 contiguous to and beneath the outwardly projecting annular flange 13 is a washer 23 which is fabricated of a compressible material, such as lead. The washer is adapted to engage the adjacent portions of a valve body that is compressible between the valve body and the flange 13 upon securement of the cylindrical sleeve within the valve seat-receiving aperture, to thereby form a watertight seal between the valve body and the cylindrical sleeve 11.

In Figures 1 to 3, inclusive, there is shown the combination valve seat and strainer of the present invention 10 supported within a globe valve 30 which forms no part of the present invention. The globe valve 30 includes a spindle 31 which carries a handwheel 32 exteriorly of the valve body 33, the spindle supporting a valve element 34 interiorly of the valve body. As clearly shown in Figure 1, the valve body is provided with a ledge 35 contiguous to and spaced from the valve element 34, the ledge 35 being provided with a valve seat-receiving aperture 36, the bounding walls of which are oppositely threaded with respect to the valve seat threads 12. Accordingly, the combination valve seat and strainer 10 can be mounted on the ledge 35 by threadedly engaging the threaded outer periphery of the sleeve 11 with the oppositely threaded portion of the valve-receiving aperture 36. The securement of the valve seat sleeve 11 within the aperture 36 presses the washer 23 to thereby form the watertight seal between the ledge 35 of the valve body 33 and the sleeve 11.

From the foregoing it is readily apparent that the combination valve seat and strainer of the present invention can be adapted to fit all types of faucets, basin cocks and bibs, and sill cocks. Further, the seat can be utilized in mixing valves or in globe valves and angle valves for steam or hot and cold water, or any other liquid or chemical to be intermittently fed to a source of utilization.

Although only one embodiment of the combination valve seat and strainer of the present invention has been described, it is readily apparent that numerous modifications can be made without departing from the spirit of the invention as set forth in the appended claim.

What I claim is:

A valve seat for attachment in a faucet including a body provided with a valve seat-receiving aperture and a valve mounted for movement toward and away from said aperture, said valve seat comprising an open-ended cylindrical sleeve fabricated of a homogeneous heat-resistant, glass-containing material, the outer periphery of said cylindrical sleeve having means extending inwardly from one end thereof adapting said sleeve to be engaged within said aperture, there being a counterbore extending inwardly from the other end of said cylindrical sleeve terminating adjacent thereto forming a seat for said valve, a substantially flat circular strainer disposed transversely within said cylindrical sleeve intermediate the open ends thereof, said strainer comprising a ring fitting slidably in the bore of said sleeve and a mesh body secured in said ring, and a plurality of outwardly extending projections on said ring for detachably securing said strainer within said sleeve, the internal surface of said sleeve being formed with respective L-shaped recesses arranged to lockingly receive said projections, said recesses extending downwardly from said counterbore, whereby the strainer may be engaged in the sleeve from above with the projections engaging in the vertical legs of said recesses, and whereby the strainer may be locked in the sleeve by rotating the strainer to engage said projections in the horizontal legs of said recesses.

JOHN B. McKENNA.

REFERENCES CITED

The following references are of record in the file of this patent:

UNITED STATES PATENTS

| Number | Name | Date |
| --- | --- | --- |
| 477,796 | Fleming | June 28, 1892 |
| 1,116,689 | Gehrke | Nov. 10, 1914 |
| 1,156,274 | Cormeny | Oct. 12, 1915 |
| 1,313,858 | Edge | Aug. 19, 1919 |
| 1,438,983 | Collin | Dec. 19, 1922 |
| 1,703,266 | Dowling | Feb. 26, 1929 |
| 1,781,771 | Wilson | Nov. 18, 1930 |
| 1,871,072 | Miller | Aug. 9, 1932 |